US012759605B2

(12) United States Patent
Chen et al.

(10) Patent No.: US 12,759,605 B2
(45) Date of Patent: Oct. 13, 2026

(54) VERTICAL-BAR CONNECTION ASSEMBLY FOR COLLAPSIBLE WAGON, AND COLLAPSIBLE WAGON

(71) Applicant: GOLEADER INDUSTRIES (ZHEJIANG) CO., LTD., Jinhua City (CN)

(72) Inventors: Xiaobo Chen, Jinhua City (CN); Haihong Gao, Jinhua City (CN); Xin Chen, Jinhua City (CN); Fengwang Chen, Jinhua City (CN); Sheng Huang, Jinhua City (CN)

(73) Assignee: GOLEADER INDUSTRIES (ZHEJIANG) CO., LTD., Jinhua City (CN)

( * ) Notice: Subject to any disclaimer, the term of this patent is extended or adjusted under 35 U.S.C. 154(b) by 281 days.

(21) Appl. No.: 18/604,915

(22) Filed: Mar. 14, 2024

(65) Prior Publication Data

US 2025/0171065 A1 May 29, 2025

(30) Foreign Application Priority Data

Nov. 23, 2023 (CN) ......................... 202311576177.1
Nov. 23, 2023 (CN) ......................... 202323170813.9

(51) Int. Cl.
*B62B 3/02* (2006.01)
*B62B 3/00* (2006.01)
*B62B 5/06* (2006.01)

(52) U.S. Cl.
CPC .............. *B62B 3/007* (2013.01); *B62B 3/025* (2013.01); *B62B 5/067* (2013.01); *B62B 2205/06* (2013.01)

(58) Field of Classification Search
CPC ......... B62B 3/007; B62B 3/025; B62B 3/022; B62B 3/027; B62B 5/067; B62B 5/06; B62B 2205/06
See application file for complete search history.

(56) References Cited

U.S. PATENT DOCUMENTS 9,580,095 B2 * 2/2017 Vargas, II ................. B62B 3/02
9,896,118 B2 * 2/2018 Choi ....................... B62B 3/007
(Continued)

FOREIGN PATENT DOCUMENTS

DE 4131368 A1 3/1993
EP 2508408 B1 7/2015
JP 3237516 U * 5/2022 ............... B62B 3/02

OTHER PUBLICATIONS

Extended European Search Report for application No. 24163363.5 dated Sep. 17, 2024, 14 pages.
(Continued)

*Primary Examiner* — John D Walters
(74) *Attorney, Agent, or Firm* — WARNER NORCROSS + JUDD LLP

(57) ABSTRACT

A vertical-bar connection assembly for a collapsible wagon and a collapsible wagon is provided. The vertical-bar connection assembly has an extended state and a folded state. The vertical-bar connection assembly comprises at least one vertical-bar connection member comprising a first connecting bar and a second connecting bar. Each of the first connecting bar and the second connecting bar has a proximal end and a distal end. The proximal ends of the first connecting bar and the second connecting bar are hinged with each other. The distal ends of the first connecting bar and the second connecting bar are respectively adapted to be hinged with the adjacent vertical bars of the collapsible wagon, and are rotatable about their respective proximal ends to move
(Continued)

away from or close to each other, so as to allow the vertical-bar connection assembly to be in the extended state or in the folded state.

20 Claims, 9 Drawing Sheets

(56) References Cited

U.S. PATENT DOCUMENTS

| | | | | |
|---|---|---|---|---|
| 10,633,010 | B1 | 4/2020 | Zhang | |
| 12,337,887 | B2 * | 6/2025 | Jiang | B62B 3/025 |
| 2003/0025301 | A1 * | 2/2003 | Banuelos, III | B62B 3/022 280/47.38 |

OTHER PUBLICATIONS

Machine assisted English translation of DE4131368A1 obtained from <https://patents.google.com/patent> on Nov. 26, 2024, 5 pages.
Machine assisted English translation of JP3237516U obtained from https://patents.google.com/patent on Nov. 26, 2024, 5 pages.

* cited by examiner

VERTICAL-BAR CONNECTION ASSEMBLY FOR COLLAPSIBLE WAGON, AND COLLAPSIBLE WAGON

CROSS-REFERENCE TO RELATED APPLICATIONS

This application claims priority to and all advantages of Chinese Patent Application No. 202311576177.1, filed on Nov. 23, 2023, and Chinese Utility Model application No. 202323170813.9, filed on Nov. 23, 2023, the contents of which are hereby incorporated by reference.

RELATED FIELD

The present disclosure relates to the technical field of wagons, and in particular to a vertical-bar connection assembly for a collapsible wagon, and to a collapsible wagon.

BACKGROUND

Wagons are commonly used handling tools in daily life and work, and bring us great convenience. However, an existing conventional wagon itself has a problem of large space occupation and is not easy to be stored and carried. For this purpose, various collapsible wagons are designed in the existing solutions, but most wagons either have too many bars and cannot be collapsed smoothly, or have a simple collapsing structure, and still occupy a large space after being collapsed and cannot be carried easily.

SUMMARY

It is an object of the present disclosure to propose a vertical-bar connection assembly for a collapsible wagon, and a collapsible wagon comprising the same. The vertical-bar connection assembly is collapsible and simple in structure, and has a small number of connecting bars. The collapsible wagon has the characteristics of convenient collapsing, small occupation space after being collapsed, and convenient storage.

For this purpose, according to one aspect of the present disclosure, a vertical-bar connection assembly for a collapsible wagon is proposed. The vertical-bar connection assembly has an extended state and a folded state and is adapted to be hinged between adjacent vertical bars of the collapsible wagon. The vertical-bar connection assembly comprises at least one vertical-bar connection member comprising a first connecting bar and a second connecting bar. Each of the first connecting bar and the second connecting bar has a proximal end and a distal end. The proximal ends of the first connecting bar and the second connecting bar are hinged with each other. The distal ends of the first connecting bar and the second connecting bar are respectively adapted to be hinged with the adjacent vertical bars of the collapsible wagon, and are rotatable about their respective proximal ends to move away from or close to each other, so as to allow the vertical-bar connection assembly to be in the extended state or in the folded state.

In accordance with the above technical concept, the present disclosure may further comprise any one or more of the following alternative options.

In accordance with some alternative embodiments, the vertical-bar connection assembly comprises at least two vertical-bar connection members spaced apart. In the at least two vertical-bar connection members, the first connecting bars are parallel to each other, and the second connecting bars are parallel to each other.

In accordance with some alternative embodiments, in the at least two vertical-bar connection members, the first connecting bars parallel to each other have same or different lengths, and the second connecting bars parallel to each other have same or different lengths.

In accordance with some alternative embodiments, the first connecting bar and the second connecting bar have same lengths.

In accordance with some alternative embodiments, in the extended state, the first connecting bar and the second connecting bar of the vertical-bar connection member are in a same straight line.

In accordance with some alternative embodiments, the vertical-bar connection assembly has a first stop portion adapted to unidirectionally restrain rotation of the first connecting bar and the second connecting bar when the vertical-bar connection assembly is in the extended state.

In accordance with some alternative embodiments, the vertical-bar connection assembly further comprises a groove-shaped housing connector having a groove opening forming a groove bottom wall and groove side walls. The groove bottom wall serves as the first stop portion. The proximal ends of the first connecting bar and the second connecting bar are inserted into the groove-shaped housing connector respectively from the groove opening and are hinged with the groove side walls.

According to another aspect of the present disclosure, a collapsible wagon is proposed. The collapsible wagon comprises a wagon frame having an expanded state and a collapsed state, and comprising: a plurality of vertical bars arranged along a circumferential direction of the wagon frame; one or more connection assemblies hinged between the adjacent vertical bars and adapted to be extended or folded to allow the wagon frame to be in the expanded state or in the collapsed state; wherein at least one of the connection assemblies is configured as the vertical-bar connection assembly for the collapsible wagon.

In accordance with the above technical concept, the present disclosure may further comprise any one or more of the following alternative options.

In accordance with some alternative embodiments, the wagon frame comprises a plurality of connection assemblies. At least one of the plurality of connection assemblies is configured as a secondary connection assembly comprising at least two secondary connection members intersectionally arranged. Each of secondary connection members comprises a third connecting bar and a fourth connecting bar hinged with each other, and the third connecting bar and the fourth connecting bar are respectively hinged with the adjacent vertical bars.

In accordance with some alternative embodiments, in the secondary connection assembly, the secondary connection members intersectionally arranged have an intersection point and are hinged at the intersection point.

In accordance with some alternative embodiments, the wagon frame further comprises a chassis hinged between the plurality of vertical bars and defining a chassis plane in the expanded state.

In accordance with some alternative embodiments, in the expanded state and in the vertical-bar connection assembly, the first connecting bar and the second connecting bar of the vertical-bar connection member are in a same straight line and are both in the chassis plane.

In accordance with some alternative embodiments, the vertical-bar connection assembly comprises at least two vertical-bar connection members spaced apart up and down, and in the expanded state, the first connecting bar and the second connecting bar of the uppermost vertical-bar connection member of the vertical-bar connection assembly are in a same straight line and are both in the chassis plane.

In accordance with some alternative embodiments, the chassis comprises a plurality of bottom support bars. Each of bottom support bars has a convergence end and a divergence end. The convergence ends of the bottom support bars are hinged with each other, and the divergence ends of the bottom support bars are respectively hinged with the plurality of vertical bars and are adapted to rotate about their respective convergence ends to move away from or close to each other.

In accordance with some alternative embodiments, the bottom support bars have same lengths.

In accordance with some alternative embodiments, the chassis has a second stop portion adapted to unidirectionally restrain rotation of the bottom support bars and to allow the plurality of bottom support bars to collectively define the chassis plane when the wagon frame is in the expanded state.

In accordance with some alternative embodiments, the chassis further comprises a hinge seat having a plurality of hinge grooves, each of which forms a hinge-groove bottom wall and hinge-groove side walls. The hinge-groove bottom wall serves as the second stop portion, and the convergence ends of the plurality of bottom support bars are respectively inserted into the plurality of hinge grooves and are hinged with the hinge-groove side walls.

In accordance with some alternative embodiments, the wagon frame further comprises a handle assembly comprising a handle seat and a handle bar mounted on the handle seat.

In accordance with some alternative embodiments, the wagon frame further comprises a handle steering assembly comprising a handle steering bar, one end of which is hinged with a vertical bar, and the other end of which is hinged with the handle seat.

In accordance with some alternative embodiments, the handle steering bar is hinged with the vertical bar via a hinge block.

In accordance with some alternative embodiments, the handle bar is configured as a telescopic bar and comprises: a lower tube body fixedly mounted on the handle seat, wherein an upper locking hole and a lower locking hole axially spaced apart are provided on a side wall of the lower tube body; and an upper tube body inserted in the lower tube body, wherein the upper tube body is provided with an elastic member and is connected to a movable button by means of the elastic member, and wherein the elastic member is adapted to bias the movable button towards the side wall of the lower tube body such that the movable button partially extends out of the upper locking hole or the lower locking hole.

In accordance with some alternative embodiments, the upper tube body is fixedly provided with a connecting block adapted to be placed in the lower tube body, the connecting block is provided with a blind hole, and the elastic member and the movable button are provided in the blind hole.

The vertical-bar connection assembly for the collapsible wagon according to the present disclosure has fewer connecting bars and is easy to be collapsed. The collapsible wagon comprising the vertical-bar connection assembly occupies a small space after being collapsed, and is convenient to be stored and carried.

BRIEF DESCRIPTION OF THE DRAWINGS

In conjunction with the accompanying drawings and with reference to the following detailed description, the features, advantages and other aspects of the embodiments of the present disclosure will become more apparent. Several embodiments of the present disclosure are shown here in an illustrative rather than limitative manner. In the accompanying drawings, the same reference numerals represent the same or similar components.

Figure 1:
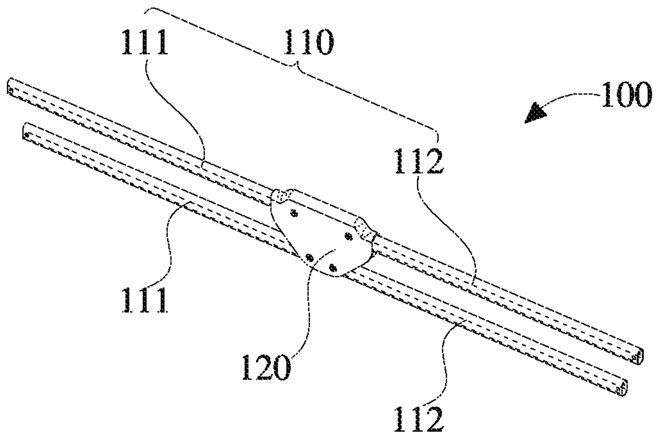
FIG. 1 is a schematic view of an exemplary embodiment of a vertical-bar connection assembly for a collapsible wagon according to the present disclosure, with the vertical-bar connection assembly being in an extended state.

Reference numerals in the figures: 1 wagon frame; 2 wheel; 100 vertical-bar connection assembly; 100A first stop portion; 110 vertical-bar connection member; 111 first connecting bar; 111A proximal end of first connecting bar; 111B distal end of first connecting bar; 112 second connecting bar; 112A proximal end of second connecting bar; 112B distal end of second connecting bar; 120 groove-shaped housing connector; 121 groove bottom wall of groove-shaped housing connector; 122 groove side wall of groove-shaped housing connector; 123 groove opening of groove-shaped housing connector; 200 vertical bar; 300 secondary connection assembly; 310 secondary connection member; 311 third connecting bar; 312 fourth connecting bar; 400 chassis; 400A second stop portion; 410 bottom support bar; 410A convergence end of bottom support bar; 410B divergence end of bottom support bar; 420 hinge seat; 421 hinge groove; 421A hinge-groove bottom wall; 421B hinge-groove side wall; 422 plate-shaped member; 500 handle assembly; 510 handle seat; 520 handle bar; 521 lower tube body; 521A upper locking hole; 521B lower locking hole; 522 upper tube body; 522A connecting block; 522B elastic member; 522C movable button; 522C1 unexposed portion of movable button; 522C2 extendable portion of movable button; 530 handle; 600 handle steering assembly; 610 handle steering bar; 620 hinge block; C collapsible wagon; P chassis plane.

DETAILED DESCRIPTION

Technical solutions in the embodiments of the present disclosure are clearly and completely described hereinafter in conjunction with the drawings in the embodiments of the present disclosure. Apparently, the embodiments described in the following are only some of the embodiments of the present disclosure, rather than all of the embodiments. Based on the embodiments in the present disclosure, all of the other embodiments obtained by those skilled in the art without any creative work fall into the protection scope of the present disclosure.

It should be noted that, all directional indicators in the embodiments of the present disclosure are only used for explaining a relative positional relationship and movement situation among the components in a certain specific posture. If the specific posture changes, the directional indicators should change accordingly.

In this specification, the positional terms, such as “upper”, “lower” and “bottom”, are defined according to the orientation of the collapsible wagon during its normal use. In this specification, the side where the handle bar of the collapsible wagon is located is defined as “front”, and the other side is defined as “rear”. However, it should be understood that this does not imply a limitation.

In addition, the technical solutions of the various embodiments can be combined with each other, provided that these combinations can be achieved by a person skilled in the art. If a combination of technical solutions is contradictory or cannot be achieved, it should be considered that such a combination of technical solutions neither exists nor falls into the protection scope of the present disclosure.

Collapsible wagons in the prior art either have too many bars and cannot be collapsed easily, or have a simple collapsing structure and still occupy a large space after being collapsed. In view of this, the present disclosure firstly proposes a vertical-bar connection assembly for a collapsible wagon. The vertical-bar connection assembly has a simple structure, and has a reduced number of connecting bars. Further, the present disclosure also proposes a collapsible wagon comprising the same. The collapsible wagon has the characteristics of convenient collapsing, small occupation space, and convenient carrying.

Figure 2:
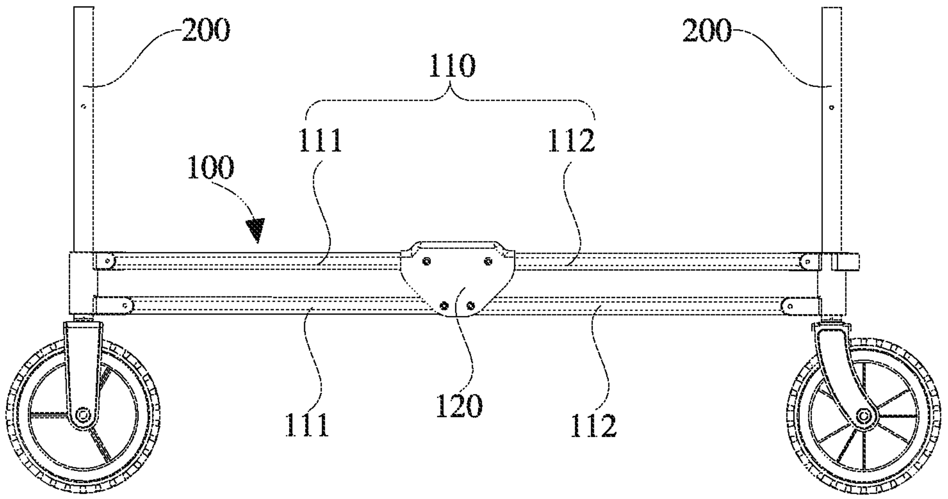
FIG. 2 is a schematic view of the vertical-bar connection assembly of FIG. 1 connected to vertical bars, with the vertical-bar connection assembly being in the extended state.
Figure 3:
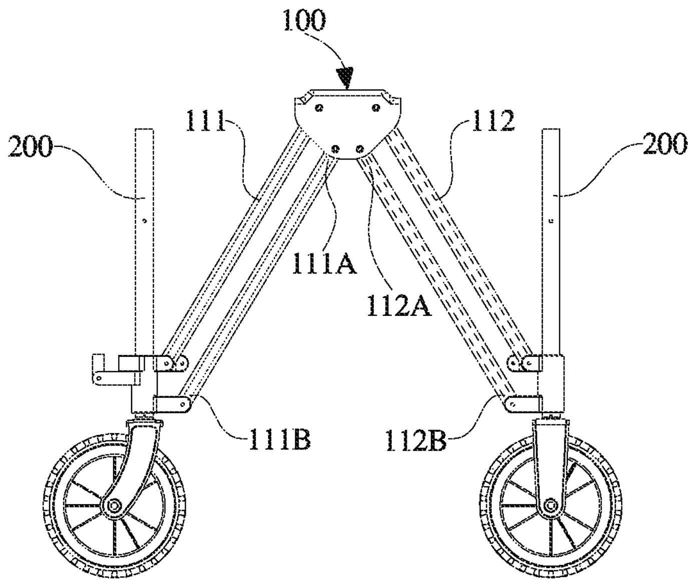
FIG. 3 is a schematic view of the vertical-bar connection assembly of FIG. 1 connected to the vertical bars, with the vertical-bar connection assembly being in a half-folded state.
Figure 4:
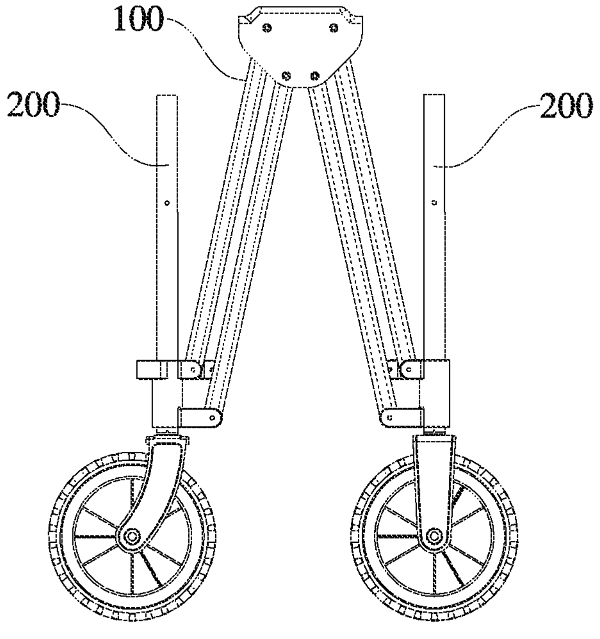
FIG. 4 is a schematic view of the vertical-bar connection assembly of FIG. 1 connected to the vertical bars, with the vertical-bar connection assembly being in a folded state.
Figure 7:
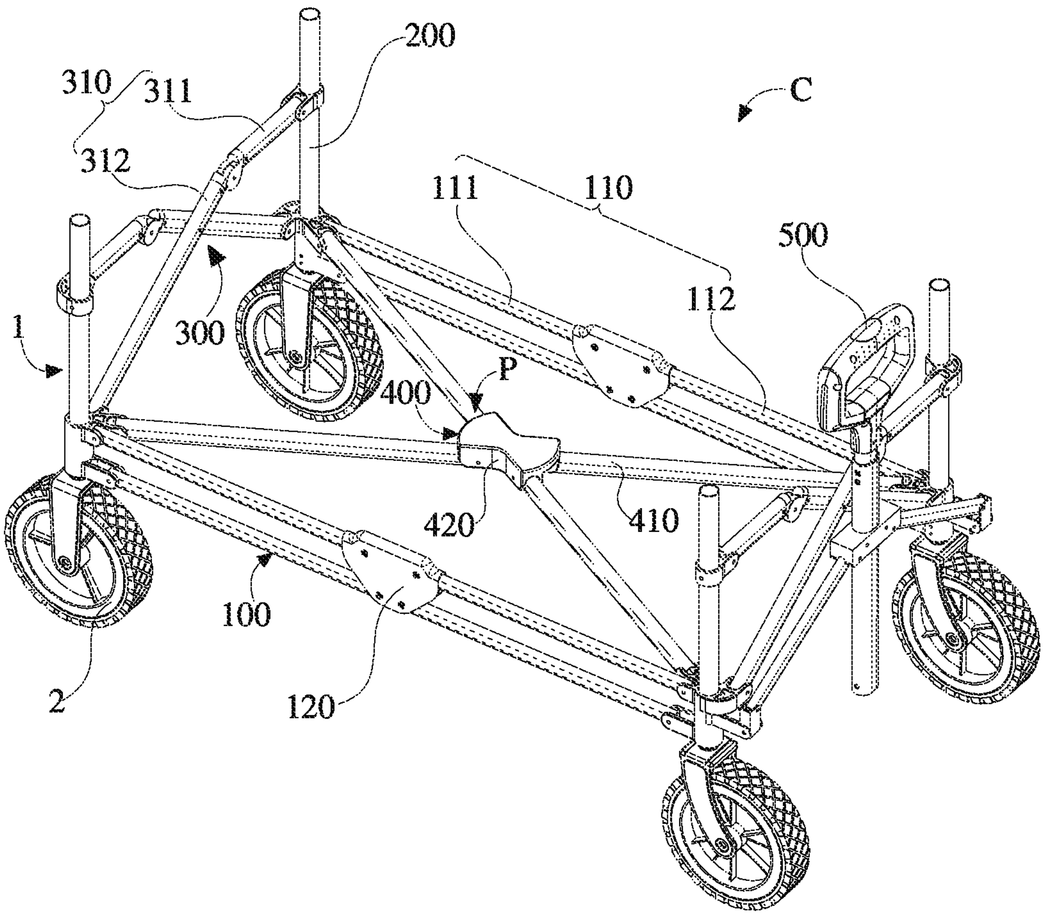
FIG. 7 is a schematic view of an exemplary embodiment of a collapsible wagon according to the present disclosure, with the collapsible wagon being in an expanded state.
Figure 8:
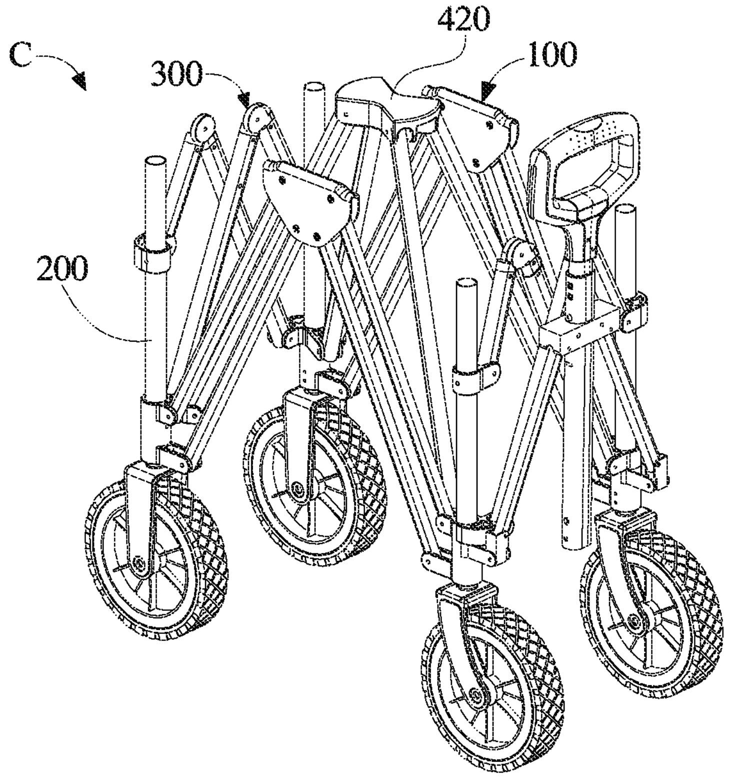
FIG. 8 is a schematic view of a half-collapsed state of the collapsible wagon of FIG. 7.
Figure 9:
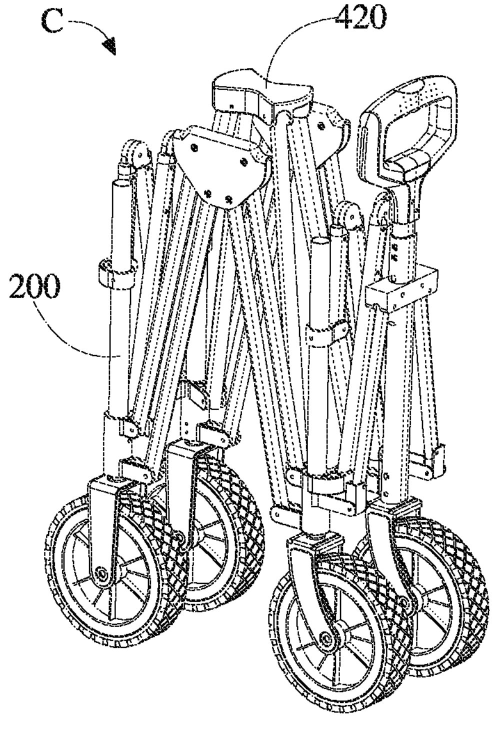
FIG. 9 is a schematic view of a collapsed state of the collapsible wagon of FIG. 7.

FIGS. 1 to 4 schematically show a vertical-bar connection assembly 100 for a collapsible wagon (hereinafter referred to as a vertical-bar connection assembly 100) according to an embodiment of the present disclosure. The vertical-bar connection assembly 100 is collapsible to have an extended state and a folded state, and can be hinged between two adjacent vertical bars of the collapsible wagon. The vertical-bar connection assembly 100 comprises at least one vertical-bar connection member 110 comprising a first connecting bar 111 and a second connecting bar 112. The first connecting bar 111 has a proximal end 111A and a distal end 111B, and the second connecting bar 112 has a proximal end 112A and a distal end 112B. The proximal end 111A of the first connecting bar 111 and the proximal end 112A of the second connecting bar 112 are hinged with each other. The distal end 111B of the first connecting bar 111 and the distal end 112B of the second connecting bar 112 are respectively hinged with the two adjacent vertical bars of the collapsible wagon. Moreover, the distal end 111B of the first connecting bar 111 and the distal end 112B of the second connecting bar 112 are rotatable about their respective proximal ends 111A and 112A to move away from or close to each other. When the distal end 111B of the first connecting bar 111 and the distal end 112B of the second connecting bar 112 move away from each other, as shown in FIG. 2, the vertical-bar connection assembly 100 is extended into the extended state, and the two adjacent vertical bars of the collapsible wagon are also away from each other. When the distal end 111B of the first connecting bar 111 and the distal end 112B of the second connecting bar 112 approach each other, as shown in FIG. 4, the vertical-bar connection assembly 100 is folded into the folded state, and the two adjacent vertical bars of the collapsible wagon also approach each other. In this way, the collapsing of the vertical-bar connection assembly 100 is achieved via the first connecting bar 111 and the second connecting bar 112, and the vertical-bar connection assembly 100 has a simple structure and a reduced number of connecting bars, compared with some existing connection assemblies or connection means, such as the connection means of two groups of X-shaped assemblies used in a side frame disclosed by CN103895672A. FIGS. 7 to 9 show an application of the vertical-bar connection assembly 100 in a collapsible wagon C, wherein the vertical-bar connection assembly 100 may comprise at least two vertical-bar connection members 110 spaced apart up and down. The collapsible wagon C will be described in detail later.

In some embodiments, the vertical-bar connection assembly 100 may comprise at least two vertical-bar connection members 110 spaced apart, and in the vertical-bar connection assembly 100 or in the at least two vertical-bar connection members 110 spaced apart as described above, the first connecting bars 111 are parallel to each other, and the second connecting bars 112 are also parallel to each other. In particular, in a preferred embodiment, the first connecting bars 111 parallel to each other have same lengths, and the second connecting bars 112 parallel to each other have same lengths. Thus, a total of four hinge points of four ends of any two first connecting bars 111 (two proximal ends 111A and two distal ends 111B) are located at four corners of a parallelogram, and a total of four hinge points of four ends of any two second connecting bars 112 (two proximal ends 112A and two distal ends 112B) are also located at four corners of a parallelogram. In this way, the first connecting bars 111 in pairs constitute opposite sides of a parallelogram mechanism, and the second connecting bars 112 in pairs also constitute opposite sides of a parallelogram mechanism. The first connecting bars 111 are always parallel to each other and the second connecting bars 112 are always parallel to each other during the extension and folding of the vertical-bar connection assembly 100. In this way, the collapsing of the vertical-bar connection assembly 100 is realized by the oppositely arranged parallelogram structures composed of the first connecting bars 111 and the second connecting bars 112. Moreover, the structure is simple, the number of connecting bars is small, and after being extended, the vertical-bar connection assembly will not be folded easily so as to well maintain its shape in the extended state. FIGS. 2 to 4 show the extended, half-folded and folded states of the vertical-bar connection assembly 100, respectively. It should be understood that, in some other embodiments of the vertical-bar connection assembly 100, the first connecting bars 111 may have different lengths, and/or the second connecting bars 112 may have different lengths. Alternatively, the first connecting bars 111 are not parallel or at least not always parallel to each other, and/or the second connecting bars 112 are not parallel or at least not always parallel to each other.

It should be understood that in the embodiments of the collapsible wagon C shown in FIGS. 7 to 9, the spaced-apart arrangement of the vertical-bar connection members 110 of one single vertical-bar connection assembly 100 is preferably an up-down spaced-apart arrangement. That is, the vertical-bar connection assembly 100 is configured to comprise at least two vertical-bar connection members 110 spaced apart up and down, which may bring additional benefits. For example, as shown in FIGS. 2 and 7, in the extended state of the vertical-bar connection assembly 100, regarding a single vertical bar 200 of the two adjacent vertical bars 200 of the collapsible wagon C connected by the vertical-bar connection assembly 100, two or more vertical-bar connection members 310 are hinged thereto, and these hinge points restrain each other, such that the single vertical bar 200 does not rotate around one single hinge point to fall down, and the stability of the collapsible wagon C in the extended state of the vertical-bar connection assembly 100 is guaranteed.

Preferably, in the vertical-bar connection assembly 100, the length of the first connecting bar 111 is equal to that of the second connecting bar 112. For example, the first connecting bar 111 and the second connecting bar 112 are symmetrical (for example, with respect to their hinge point), such that the first connecting bar 311 and the second connecting bar 312 are rotatable symmetrically to achieve the extension and folding of the vertical-bar connection assembly 100. It should be understood that the technical feature, i.e. the length of the first connecting bar 111 is equal to that of the second connecting bar 112, can be combined with the technical features as described above, i.e. the first connecting bars 111 are parallel to each other and have same lengths, and the second connecting bars 112 are parallel to each other and have same lengths.

Figure 5:
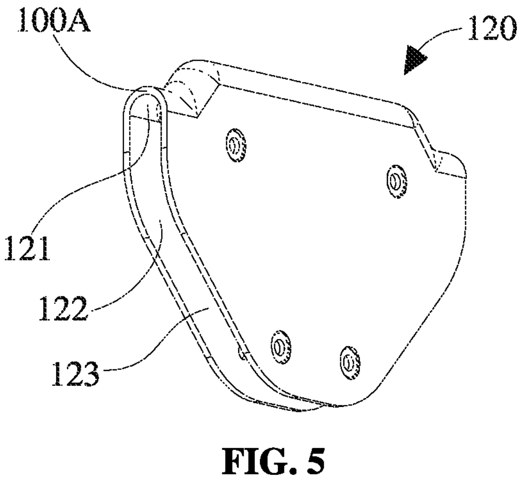
FIG. 5 is a schematic view of an exemplary embodiment of a groove-shaped housing connector.
Figure 6:
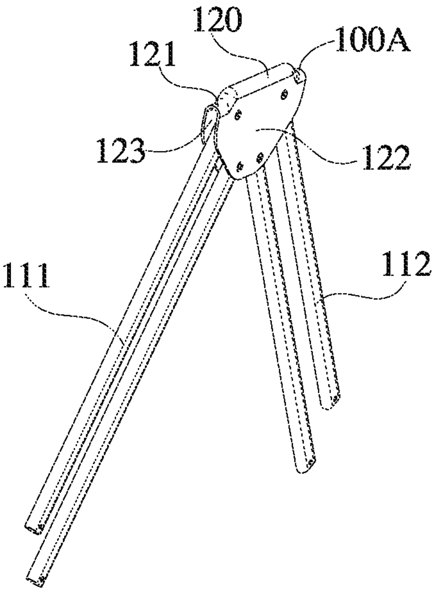
FIG. 6 is a schematic view of the groove-shaped housing connector connected to a first connecting bar and a second connecting bar.

It should be understood that after the first connecting bar 111 and the second connecting bar 112 rotate such that the vertical-bar connection assembly 100 is extended from the folded state to the extended state, it is required to prevent the first connecting bar 111 and the second connecting bar 112 from continuing to rotate after the vertical-bar connection assembly 100 has been extended into the right place. Therefore, in some embodiment as shown in FIGS. 5 and 6, the vertical-bar connection assembly 100 may also have a first stop portion 100A. The first stop portion 100A may unidirectionally restrain the rotation of the first connecting bar 111 and the second connecting bar 112 when the vertical-bar connection assembly 100 is in the extended state, that is, restrain the further rotation action of the first connecting bar 111 and the second connecting bar 112 from the folded state to the extended state, after the vertical-bar connection assembly 100 is extended from the folded state to the extended state and has been extended into the right place. In particular, in the collapsible wagon C shown in FIGS. 7 to 9, regarding the vertical-bar connection assembly 100 configured to comprise at least two vertical-bar connection members 110 spaced apart up and down, the first stop portion 100A prevents the proximal ends 111A and 112A of the first connecting bar 111 and the second connecting bar 112 from continuing to move downward.

In some further embodiments, as shown in FIGS. 5 and 6, the vertical-bar connection assembly 100 comprises a groove-shaped housing connector 120 having a groove opening 123 forming a groove bottom wall 121 and groove side walls 122. The groove bottom wall 121 serves as the first stop portion 100A. The first connecting bar 111 and the second connecting bar 112 are hinged with each other via the groove-shaped housing connector 120. The proximal end 111A of the first connecting bar 111 and the proximal end 112A of the second connecting bar 112 are inserted into the groove-shaped housing connector 120 respectively from two ends of the groove opening 123 and are hinged with the groove side walls 122 of the groove-shaped housing connector 120. The groove bottom wall 121 of the groove-shaped housing connector 120 serves as the first stop portion 100A, and the side surface of the proximal end 111A of the first connecting bar 111 and the side surface of the proximal end 112A of the second connecting bar 112 respectively abut against the groove bottom wall 121 (that is, the first stop portion 100A) after the vertical-bar connection assembly 100 has been extended from the folded state to the extended state, such that the first connecting bar 111 and the second connecting bar 112 cannot continue to rotate, but can rotate reversely to be folded. In particular, in the collapsible wagon C shown in FIGS. 7 to 9, the vertical-bar connection assembly 100 is configured to comprise at least two vertical-bar connection members 110 spaced apart up and down, the groove opening 123 of the groove-shaped housing connector 120 is configured to open downward, and the side surfaces of the proximal ends 111A of the first connecting bars 111 and the side surfaces of the proximal ends 112A of the second connecting bars 112 respectively abut against the groove bottom wall 121 of the groove-shaped housing connector 120 and cannot continue to move downward when the vertical-bar connection assembly 100 is in the extended state. It should be understood that, according to this function, the first stop portion 100A may have various other variants, which will not be described here.

It should be understood that in the case that the vertical-bar connection assembly 100 comprises only one vertical-bar connection member 110, one groove-shaped housing connector 120 may be provided to be connected to the first connecting bar 111 and the second connecting bar 112 of the vertical-bar connection member 110. In the case that the vertical-bar connection assembly 100 comprises at least two vertical-bar connection members 110, the groove-shaped housing connector 120 may be individually provided for the respective vertical-bar connection member 110 to be connected to the first connecting bar 111 and the second connecting bar 112 of the respective vertical-bar connection member 110. Moreover, in such case, a connector (not shown), such as a connection plate, may be further provided to connect these groove-shaped housing connectors into a whole, so as to achieve synchronous extension and folding actions of the vertical-bar connection members 110, thereby increasing the strength of the entire vertical-bar connection assembly 100. Alternatively, as shown in FIGS. 1 to 6, one groove-shaped housing connector 120 may be provided, and the proximal end 111A of the first connecting bar 111 and the proximal end 112A of the second connecting bar 112 of the respective vertical-bar connection member 110 are inserted into the groove-shaped housing connector 120 respectively from two ends of the groove opening 123 and are hinged with the groove side walls 122 of the groove-shaped housing connector 120, thereby simplifying the structure and achieving synchronous extension and folding actions of the vertical-bar connection members 110 in the single vertical-bar connection assembly. The side surface of the proximal end 111A of the first connecting bar 111 and the side surface of the proximal end 112A of the second connecting bar 112 of the at least one vertical-bar connection member 110 respectively abut against the groove bottom wall 121 of the groove-shaped housing connector 120 after the vertical-bar connection assembly 100 has been extended from the folded state to the extended state. Regarding the vertical-bar connection assembly 100 of the collapsible wagon C configured to comprise at least two vertical-bar connection members 110 spaced apart up and down, the side surface of the proximal end 111A of the first connecting bar 111 and the side surface of the proximal end 112A of the second connecting bar 112 of the uppermost vertical-bar connection member 110 respectively abut against the groove bottom wall 121 of the groove-shaped housing connector 120, such that the first connecting bars 111 and the second connecting bars 112 in the entire vertical-bar connection assembly 100 are prevented from continuing to rotate.

FIGS. 7 to 9 schematically show a collapsible wagon C according to an embodiment of the present disclosure. The collapsible wagon comprises a wagon frame 1 and a plurality of wheels 2 arranged on the wagon frame 1. The wagon frame 1 has an expanded state and a collapsed state. In the expanded state, the wheels 2 are located at the bottom of the wagon frame 1. The wagon frame 1 comprises a plurality of vertical bars 200 and one or more connection assemblies, wherein at least one of the connection assemblies is configured as the above-mentioned vertical-bar connection assembly 100.

The plurality of vertical bars 200 are arranged along the circumferential direction of the wagon frame 1. The connection assemblies are respectively hinged between two adjacent vertical bars 200 along the circumferential direction of the wagon frame 1. The connection assemblies are collapsible to be extended and folded so as to allow the wagon frame 1 to be in the expanded state or in the collapsed state. It should be understood that, according to actual needs, the number of the connection assemblies may vary with the number of the vertical bars 200. For example, it can be ensured that a connection assembly is connected between any two adjacent vertical bars 200. For example, in the case that the number of the vertical bars 200 is two (as the case described later that the number of the bottom support bars 110 is two and the two bottom support bars 110 are arranged in a V shape in the expanded state), the number of the connection assembly may be one. In the case that the number of vertical bars 200 is three or more, the number of the connection assemblies may be equal to the number of vertical bars 200, that is three or more. Of course, in some embodiments, a plurality of (two or more) connection assemblies may be provided between two adjacent vertical bars 200.

In an embodiment with only one connection assembly, the one connection assembly is configured as the vertical-bar connection assembly 100 as described above. In an embodiment with a plurality of connection assemblies, at least one of the plurality of connection assemblies is configured as the vertical-bar connection assembly 100 as described above. When applied to the collapsible wagon C, the proximal end 111A of the first connecting bar 111 and the proximal end 112A of the second connecting bar 112 in the vertical-bar connection assembly 100 are movable downward or upward, such that their distal ends 111B and 112B rotate about their respective proximal ends 111A and 112A to move away from or close to each other, thereby allowing the vertical-bar connection assembly 100 to be extended or folded. When the vertical-bar connection assembly 100 is extended into the extended state, the wagon frame 1 is expanded into the expanded state, and when the vertical-bar connection assembly 100 is folded into the folded state, the wagon frame 1 is collapsed into the collapsed state. Preferably, the vertical-bar connection assembly 100 comprised in the wagon frame 1 is configured to comprise at least two vertical-bar connection members 110 spaced apart up and down.

Since the vertical-bar connection assembly 100 has fewer connecting bars and is easy to be collapsed, the collapsible wagon C comprising the vertical-bar connection assembly 100 occupies a small space after being collapsed, and is convenient to be stored and carried.

Figure 10:
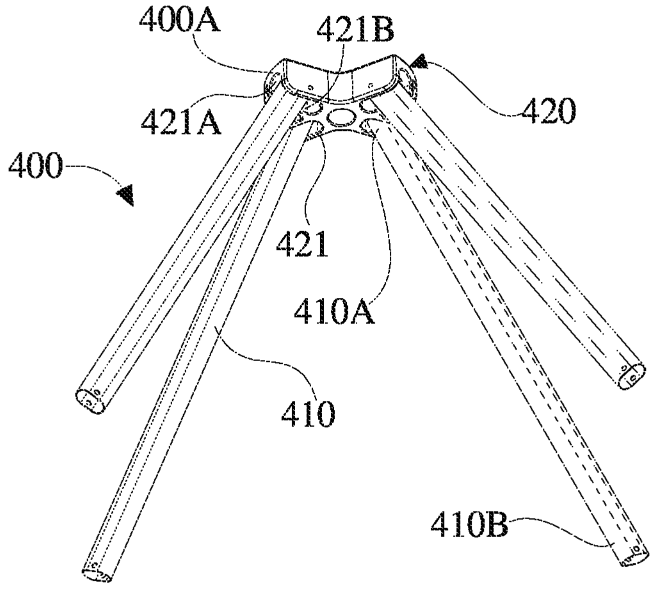
FIG. 10 is a schematic view of an exemplary embodiment of a chassis, with its divergence ends being half-gathered.

The wagon frame 1 may further comprise a chassis 400 hinged between the plurality of vertical bars 200. The chassis 400 defines a chassis plane P in the expanded state of the wagon frame 1, and the articles to be transported may be placed on the chassis 400/the chassis plane P. In some embodiments, the chassis 400 may be collapsible. As shown in FIG. 10, the chassis 400 comprises a plurality of bottom support bars 410. Each of bottom support bars 410 has a convergence end 410A and a divergence end 410B. The bottom support bars 110 have same lengths and are arranged at an angle to each other. The convergence ends 410A of the bottom support bars 410 are hinged with each other. The divergence ends 410B of the bottom support bars 410 are rotatable about their respective convergence ends 410A to move away from or close to each other. The vertical bars 200 are arranged circumferentially with the convergence ends 410A hinged with each other as the center, and are respectively hinged with the divergence ends 410B of the bottom support bars 410. When the divergence ends 410B move away from each other, the vertical bars 200 also move away from each other, and the wagon frame 1 is synchronously expanded into the expanded state. When the divergence ends 410B move close to each other, the vertical bars 200 move close to each other, and the wagon frame 1 is synchronously collapsed into the collapsed state. In the expanded state, the bottom support bars 410 collectively define the chassis plane P. The number of the bottom support bars 410 may be the same as that of the vertical bars 200, for example, two or more, including three or more, four or more, five or more, etc. For example, in the embodiment shown in FIG. 7, the number of the bottom support bars 410 is four, and the four bottom support bars 410 are arranged in an X shape in the expanded state. In other embodiments not shown, the number of the bottom support bars 410 may be three, and the bottom support bars are arranged in a Y shape in the expanded state. For example, only one rearward-extending bottom support bar and two forward-extending bottom support bars (not shown) are provided, as compared with the embodiment shown in FIG. 7. Alternatively, the number of the bottom support bars 410 may be two, and the bottom support bars are arranged in a V shape in the expanded state. For example, only two forward-extending bottom support bars (not shown) are provided, as compared with the embodiment shown in FIG. 7. Of course, according to actual needs, the number of the bottom support bars 410 may also be five, six, seven, eight and the like.

In some embodiments, the vertical-bar connection assembly 100 comprises only one vertical-bar connection member 110. In the extended state of the vertical-bar connection assembly 100, the first connecting bar 111 and the second connecting bar 112 of the vertical-bar connection member 110 in the vertical-bar connection assembly 100 are in a same straight line. In the case that the vertical-bar connection assembly 100 is applied to the collapsible wagon C, the first connecting bar 111 and the second connecting bar 112 of the vertical-bar connection assembly 100 are not only in a same straight line, but also in the chassis plane P in the expanded state of the wagon frame 1, i.e., in the extended state of the vertical-bar connection assembly 100, so as to structurally enhance the chassis 400 defining the chassis plane P and to carry the articles to be transported together.

In some other embodiments, the vertical-bar connection assembly 100 comprises at least two vertical-bar connection members 110 spaced apart, thus each vertical-bar connection member 110 of the vertical-bar connection assembly 100 is configured such that, in the extended state of the vertical-bar connection assembly 100, the first connecting bar 111 and the second connecting bar 112 are in a same straight line. In the case that the vertical-bar connection assembly 100 is applied to the collapsible wagon C, as the embodiment shown in FIGS. 7 to 9, the vertical-bar connection assembly 100 is configured to comprise at least two vertical-bar connection members 110 spaced apart up and down, and in the expanded state of the wagon frame 1, the first connecting bar 111 and the second connecting bar 112 of the uppermost vertical-bar connection member 110 of the vertical-bar connection assembly 100 are in a same straight line and are both in the chassis plane P. Thus, in the expanded state, the uppermost vertical-bar connection member 110 of the vertical-bar connection assembly 100 can structurally enhance the chassis 400 defining the chassis plane P and carry the articles to be transported together with the chassis 400, thereby enhancing the carrying capacity of the collapsible wagon C, and pressing the articles to be transported on the vertical-bar connection members 110 during use. This prevents collapsing of the vertical-bar connection members 110 during use by means of the weight of the articles to be transported.

It should be understood that, according to actual needs, each of the connection assemblies of the wagon frame 1 can be configured as the vertical-bar connection assembly 100. For example, in some embodiments with each connection assembly being configured as the vertical-bar connection assembly 100 comprising at least two vertical-bar connection members 110 spaced apart up and down, in the expanded state, the first connecting bar 111 and the second connecting bar 112 of the uppermost vertical-bar connection member 110 in each vertical-bar connection assembly 100 are both in the chassis plane P. In this way, the vertical-bar connection assemblies 100 and the chassis 400 collectively constitute a platform for placing articles, and in this case, the upper ends of the vertical bars 200 may be arranged to be flush with the chassis plane P, such that there is no railing, facilitating the placement of larger articles. Alternatively, some of the connection assemblies are each configured as the vertical-bar connection assembly 100, and other connection assemblies may each be configured in any existing or non-existing suitable form. In the embodiment as shown in FIGS. 7 to 9, among the four connection assemblies, two opposing connection assemblies are each configured as the vertical-bar connection assembly 100. The two vertical-bar connection assemblies 100 are symmetrically arranged on the left and right sides of the wagon frame 1/the chassis 400. The other two opposing connection assemblies are each configured as a secondary connection assembly 300, which will be described below.

Figure 12:
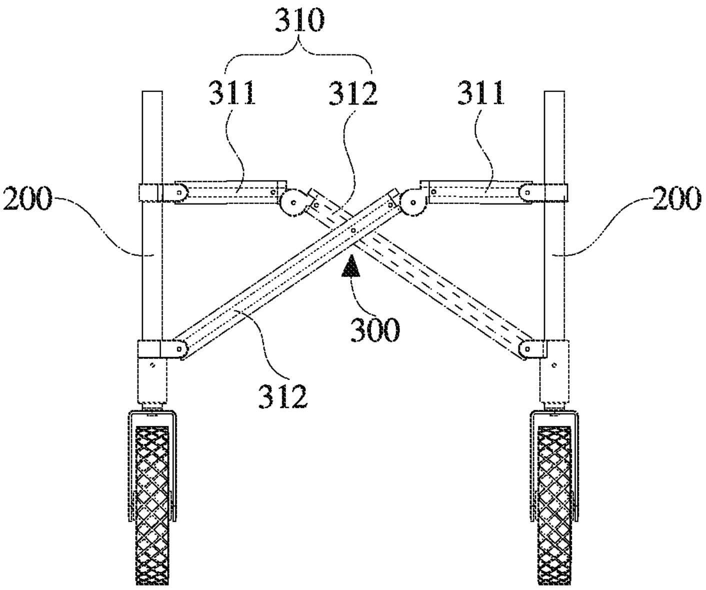
FIG. 12 is a schematic view of an exemplary embodiment of a secondary connection assembly connected to the vertical bars, with the secondary connection assembly being in an extended state.
Figure 13:
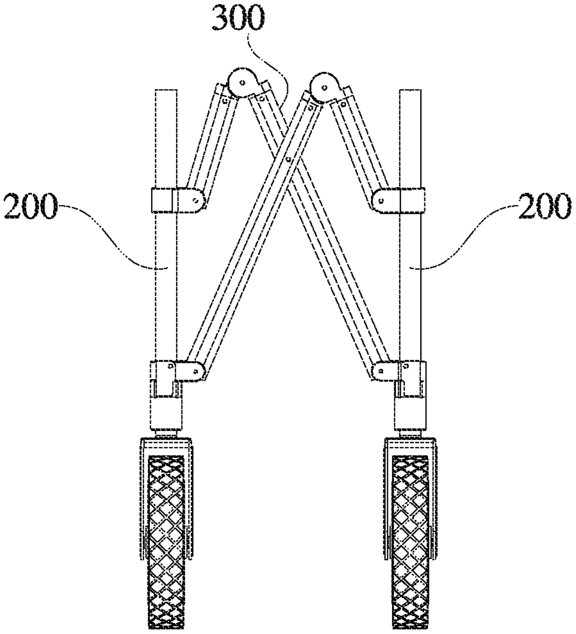
FIG. 13 is a schematic view of the secondary connection assembly of FIG. 12 connected to the vertical bars, with the secondary connection assembly being in a half-folded state.
Figure 14:
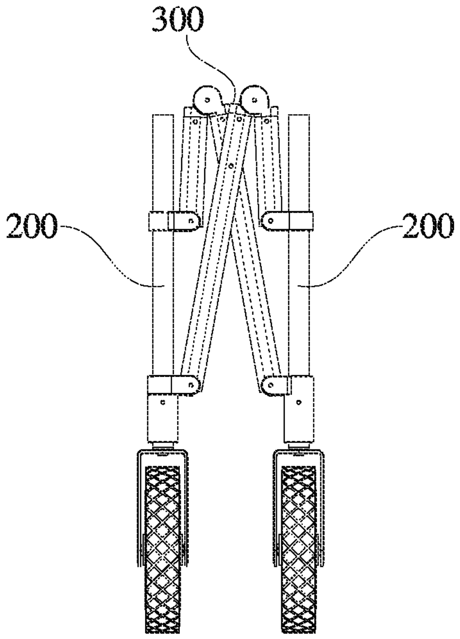
FIG. 14 is a schematic view of the secondary connection assembly of FIG. 12 connected to the vertical bars, with the secondary connection assembly being in a folded state.
Figure 15:
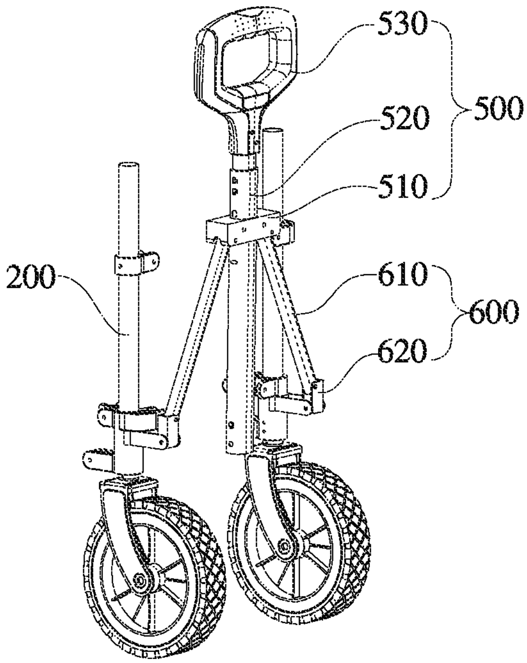
FIG. 15 is a schematic view of an exemplary embodiment of a handle assembly and a handle steering assembly.

In the case that the wagon frame 1 has a plurality of connection assemblies, on the premise of at least one connection assembly being configured as the vertical-bar connection assembly 100, at least one of the plurality of connection assemblies may be configured as the secondary connection assembly 300 comprising two secondary connection members 310 intersectionally arranged. One end of one secondary connection member 310 is hinged with the upper end of one of the two adjacent vertical bars 200, and the other end to the lower end of the other of the two adjacent vertical bars 200. The other secondary connection member 310 is arranged reversely to form an intersectional arrangement. Specifically, each secondary connection member 310 comprises a third connecting bar 311 and a fourth connecting bar 312 hinged with each other, and the third connecting bar 311 and the fourth connecting bar 312 are respectively hinged with the two adjacent vertical bars 200. When the third connecting bar 311 and the fourth connecting bar 312 of the secondary connection member 310 rotate to move away from each other, the angle between the third connecting bar 311 and the fourth connecting bar 312 becomes larger, the secondary connection assembly 300 is extended, the two adjacent vertical bars 200 also move away from each other, and the wagon frame 1 is expanded into the expanded state, as shown in FIGS. 7 and 12. When the third connecting bar 311 and the fourth connecting bar 312 of the secondary connection member 310 rotate to move close to each other, the angle between the third connecting bar 311 and the fourth connecting bar 312 becomes smaller, the secondary connection assembly 300 is folded, the two adjacent vertical bars 200 also move close to each other, and the wagon frame 1 is collapsed into the collapsed state, as shown in FIGS. 9 and 14. The intersectional secondary connection members 310 may function as railings to prevent articles to be transported from slipping off. In the secondary connection assembly 300, the secondary connection members 310 intersectionally arranged have an intersection point and are hinged at the intersection point. In each secondary connection member 310, the fourth connecting bar 312 is longer than the third connecting bar 311. The two fourth connecting bars 312 intersect and are hinged with each other, such that the two secondary connection members 310 are linked with each other during the expanding or collapsing process. It should be understood that the number of the intersectionally arranged secondary connection members 310 comprised in the secondary connection assembly 300 may be a suitable number of two or more, in particular an even number of two or more. In particular, in a single secondary connection assembly 300, the secondary connection members 310 are symmetrical in pairs. In the embodiment as shown in FIGS. 12 to 14, in the secondary connection assembly 300, the two secondary connection members 310 are symmetrical (with respect to their intersection point). The exemplary embodiment shown in FIGS. 7 to 9 shows a wagon frame having four connection assemblies, among which two opposing connection assemblies are each configured as the secondary connection assembly 300. The two secondary connection assemblies 300 are symmetrically arranged on the front and rear sides of the wagon frame 1/the chassis 400. The other two opposing connection assemblies are each configured as the vertical-bar connection assembly 100 as described above.

It should be understood that a connection assembly of the collapsible wagon C is preferably configured as the vertical-bar connection assembly 100. For example, in some embodiments, the wagon frame 1 comprises only one connection assembly, and the connection assembly is configured as the vertical-bar connection assembly 100. In some other embodiments, the wagon frame 1 comprises a plurality of (in this case, two or more, three or more, and the like) connection assemblies. On the premise of one connection assembly being configured as the vertical-bar connection assembly 100, the other connection assemblies may each be configured, depending on needs, as the vertical-bar connection assembly 100 or the secondary connection assembly 300, or as other existing or non-existing suitable connection assembly.

Preferably, in the embodiment shown in FIGS. 1 to 4 and FIGS. 7 to 9, the vertical-bar connection assembly 100 comprises two vertical-bar connection members 110 spaced apart up and down. And in a single vertical-bar connection member 110, the first connecting bar 111 and the second connecting bar 112 are symmetrical (for example, with respect to their hinge point), and the two vertical-bar connection assemblies 100 are symmetrically arranged on the left and right sides of the wagon frame 1. Each secondary connection assembly 300 comprises two intersectionally arranged secondary connection members 310 hinged at their intersection point. And, in each secondary connection assembly 300, the two intersectionally arranged secondary connection members 310 are symmetrical (for example, with respect to their intersection point). The two secondary connection assemblies 300 are symmetrically arranged on the front and rear sides of the wagon frame 1. The bottom support bars 410 of the chassis 400 have same lengths. It should be understood that the extending, folding, collapsing and similar movements among the various connection assemblies of the collapsible wagon C, and between the connection assemblies and the chassis 400, are coordinated to achieve the expanding and collapsing of the collapsible wagon C.

Figure 11:
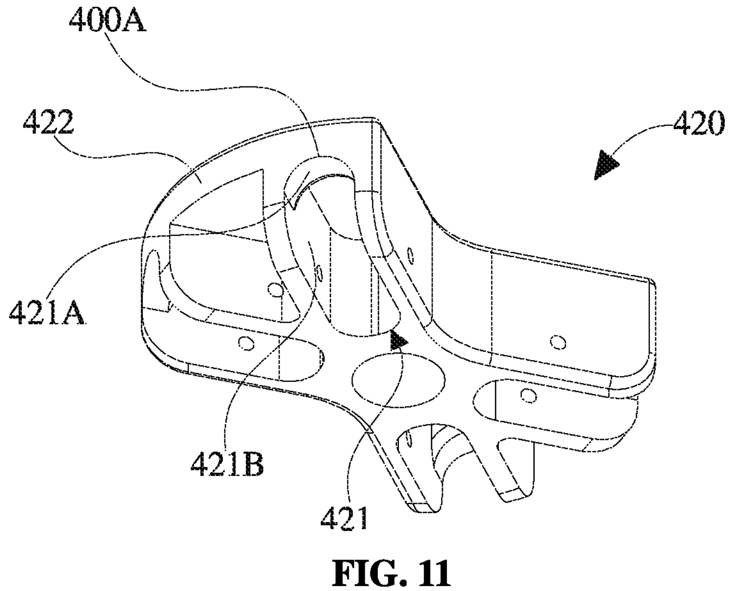
FIG. 11 is a schematic view of an exemplary embodiment of a hinge seat.

After the bottom support bars 410 rotate such that the wagon frame 1 is expanded from the collapsed state into the expanded state, the bottom support bars 410 need to be prevented from continuing to rotate after the wagon frame 1 has been expanded into the right place. Therefore, in some embodiments, as shown in FIG. 10, the chassis 400 has a second stop portion 400A. When the wagon frame 1 is in the expanded state, the second stop portion 400A may unidirectionally restrain the rotation of the bottom support bars 410, that is, prevent the convergence ends 410A of the bottom support bars 410 from moving downward. And, in the expanded state of the wagon frame 1, the bottom support bars 410 collectively define the chassis plane P via the second stop portion 400A. In some further embodiments, referring to FIGS. 10 and 11, the chassis 400 further comprises a hinge seat 420. The convergence ends 410A of the bottom support bars 410 are hinged with each other via the hinge seat 420. In the embodiment as shown in FIGS. 10 and 11, the hinge seat 420 has a plurality of hinge grooves 421, each of which forms a hinge-groove bottom wall 421A and hinge-groove side walls 421B. Each hinge groove 421 may open downward. Specifically, the hinge seat 420 may comprise a plate-shaped member 422, and the hinge-groove side walls 421B extend downward from the bottom surface of the plate-shaped member 422 to form the hinge grooves 421 that open downward. The convergence ends 410A of the bottom support bars 410 are respectively inserted into the respective hinge grooves 421 and are hinged with the hinge-groove side walls 421B of the hinge grooves 421 by pins. The bottom support bars 410 are rotatable about the pins/the convergence ends 410A. In the expanded state, the hinge-groove bottom wall 421A serves as the second stop portion 400A, and the bottom support bars 410 can rotate such that the hinge-groove bottom walls 421A (or the bottom surface of the plate-shaped member 422) of the hinge grooves 421 abut against the side surfaces of the convergence ends 410A of the bottom support bars 410, so as to obtain the chassis plane P.

It should be understood that the convergence ends 410A of the bottom support bars 410 also move downward or upward when the bottom support bars 410 of the chassis 400 move away from or close to each other, and the wagon frame 1 synchronously is expanded or collapsed. Therefore, during use of the collapsible wagon C, the hinge seat 420 hinged with the convergence ends 410A can also be used as a force application point for collapsing and expanding the wagon frame 1. When the wagon frame 1 is to be collapsed, the hinge seat 420 is lifted upward, the convergence ends 410A move upward, and the wagon frame 1 can be collapsed into the collapsed state. When the wagon frame 1 is to be expanded, the hinge seat 420 is pressed downward, the convergence ends 410A move downward, and the wagon frame 1 can be expanded into the expanded state. It should also be understood that, in some embodiments not shown, the wheels 2 may be mounted on the hinge seat 420. For example, the wheels 2 are mounted between the plurality of hinge grooves 421, so as to provide support in the expanded state of the wagon frame 1. It should also be understood that, in some embodiments, the collapsible wagon C may be used as a stool in the collapsed state of the wagon frame 1, for example, in the case that the plate-shaped member 422 of the hinge seat 420 has a suitable size.

It should be understood that the function of the second stop portion 400A is to unidirectionally restrain the rotation of the bottom support bars 410 when the wagon frame 1 is in the expanded state, that is to prevent the convergence ends 410A of the bottom support bars 410 from moving downward, thereby forming the chassis plane P. Therefore, the second stop portion 400A may have other variants according to this function. For example, in the embodiment of "the number of the bottom support bars 410 is two, and the bottom support bars are arranged in a V shape in the expanded state", a stop block (not shown) may be provided below the hinge position of a vertical bar 200 with a bottom support bar 410. The stop block may be provided on the vertical bar 200, and serve as the second stop portion. In the expanded state, the stop block abuts against the lower surface of the divergence end 410B of the bottom support bar 410, thereby preventing the convergence end 410A of the bottom support bar 410 from continuing to move downward.

It should be understood that, depending on actual needs, the plurality of wheels 2 of the wagon frame 1 may be arranged at suitable positions of the wagon frame 1, including be arranged on the bottom support bars 410, the first connecting bars 111 and the second connecting bars 112. Preferably, the plurality of wheels 2 are respectively arranged at the lower ends of the vertical bars 200. Optionally, the wheels 2 may be configured as universal wheels.

It should be understood that the first connecting bar 111, the second connecting bar 112, the vertical bar 200, the third connecting bar 311, the fourth connecting bar 312, and the bottom support bar 410 described herein may be a bar of any suitable form, including but not limited to, a straight bar, a curved bar, a wave-shaped bar, or a combination thereof (for example, a section of the entire bar is straight, and another section thereof is wave-shaped). Preferably, a straight bar is used.

In some embodiments, as shown in FIGS. 7 to 9 and FIG. 15, the wagon frame 1 further comprises a handle assembly 500 for pushing and pulling the collapsible wagon C. The handle assembly 500 comprises a handle seat 510 and a handle bar 520 mounted on the handle seat 510. The upper end of the handle bar 520 may be mounted with a handle 530 to facilitate pushing and pulling. Besides, in order to facilitate collapsing of the wagon frame 1 and rotation of the handle bar 520, the wagon frame 1 may further comprise a handle steering assembly 600. The handle steering assembly 600 comprises a pair of handle steering bars 610 located on two sides of the handle seat 510 respectively. The handle assembly 500 is hinged between the two adjacent vertical bars 200 via the pair of handle steering bars 610. One end of each handle steering bar 610 is hinged with a vertical bar 200, and the other end is hinged with the handle seat 510. Preferably, the pair of handle steering bars 610 are symmetrically arranged on two sides of the handle seat 510. It should be understood that the extension and folding of the pair of handle steering bars 610 are coordinated with the extension, folding, collapsing and similar movements of the connecting assemblies and the chassis 400. As shown in FIGS. 7 to 9 and FIG. 15, a handle steering bar 610 is hinged with a vertical bar 200 via a hinge block 620. The hinge block 620 is hinged with the handle steering bar 610 and the vertical bar 200, respectively. Specifically, the hinge block 620 is hinged with the vertical bar 200, such that the handle assembly 500 and the handle steering bar 610 can be integrally turned over with respect to the chassis plane P. The hinge block 620 is hinged with the handle steering bar 610 so as to cooperate with the hinge between the handle steering bar 610 and the handle seat 510, such that the pair of handle steering bars 610 can be expanded or collapsed when the wagon frame 1 is expanded or collapsed.

Figure 16:
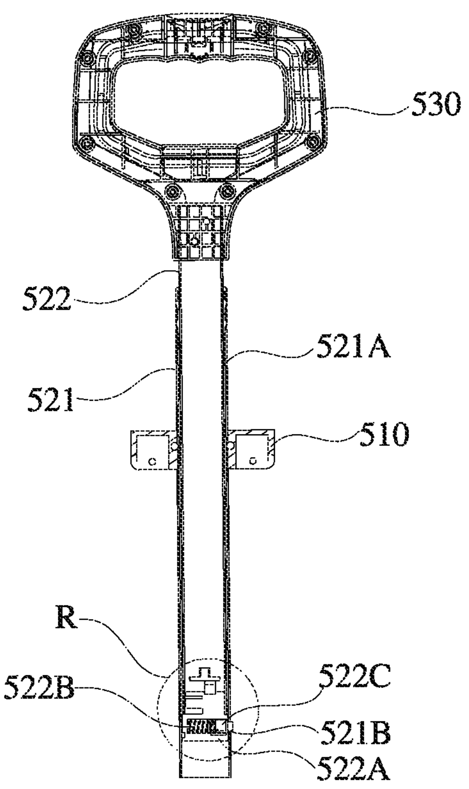
FIG. 16 is a cross-sectional view of an exemplary embodiment of the handle assembly.
Figure 17:
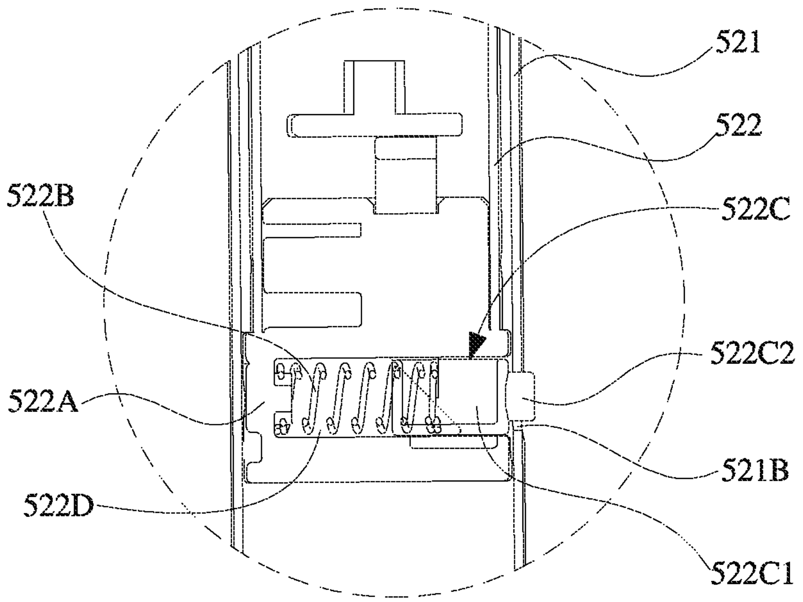
FIG. 17 is an enlarged view of the portion R in FIG. 16.

In some embodiments, as shown in FIGS. 16 and 17, the handle bar 520 may be configured as a telescopic bar and comprise a lower tube body 521 and an upper tube body 522, and the upper end of the upper tube body 522 is provided with the handle 530. The lower tube body 521 is fixedly mounted on the handle seat 510. An upper locking hole 521A and a lower locking hole 521B axially spaced apart are provided on the side wall of the lower tube body 521. The upper tube body 522 is inserted in the lower tube body 521. The upper tube body 522 is provided with an elastic member 522B and is connected to a movable button 522C by means of the elastic member 522B. The elastic member 522B may bias the movable button 522C towards the side wall of the lower tube body 521 such that the movable button 522C may partially extend out of the upper locking hole 521A or the lower locking hole 521B. As shown in FIGS. 16 and 17, the elastic member 522B may be configured as a compressed spring or an elastic sheet to give a biasing force to the movable button 522C, which may partially extend out of the upper locking hole 521A or the lower locking hole 521B. For example, the size of the unexposed portion 522C1 of the movable button 522C is larger than that of the upper locking hole 521A and the lower locking hole 521B, and the size of the extendable portion 522C2 is less than or equal to that of the upper locking hole 521A and the lower locking hole 521B, such that the movable button can partially extend out of the upper locking hole 521A or the lower locking hole 521B.

While the upper tube body 522 is pulled to move axially in the lower tube body 521, the movable button 522C abuts against the inner side of the side wall of the lower tube body 521 under the elastic biasing force of the elastic member 522B, and the handle bar 520 is extended. When the movable button 522C is aligned with the upper locking hole 521A, the elastic member 522B pushes the movable button 522C to partially extend out of the upper locking hole 521A, thereby locking the upper tube body 522 to the lower tube body 521. While the upper tube body 522 is pushed to move axially in the lower tube body 521, the handle bar 520 is contracted. When the movable button 522C is aligned with the lower locking hole 521B, the elastic member 522B pushes the movable button 522C to partially extend out of the lower locking hole 521B, thereby locking the upper tube body 522 to the lower tube body 521. When the upper tube body 522 and the lower tube body 521 are locked to each other, if the movable button 522C is pressed such that the movable button 522C is retracted until it does not extend out of the upper locking hole 521A or the lower locking hole 521B, the locking between the upper tube body 522 and the lower tube body 521 is released. In some embodiments, as shown in FIG. 17, the upper tube body 522 is fixedly connected to a connection block 522A that can be placed in the lower tube body 521. The connection block 522A can be fixedly provided at the lower end of the upper tube body 522 and have a blind hole 522D, and the elastic member 522B and the movable button 522C are provided in the blind hole 522D. The unexposed portion 522C1 of the movable button 522C remains in the blind hole 522D during the movement of the movable button 522C. The blind hole 522D provides mounting space for the elastic member 522B and the movable button 522C, and provides guidance for the elastic movement of the elastic member 522B configured as a compressed spring. Of course, in other embodiments, the blind hole may be directly provided in the upper tube body 522.

It should be understood that the above description of the preferred embodiments is detailed but cannot therefore be considered as a limitation to the scope of protection of the present disclosure. In light of the present disclosure, a person skilled in the art may make substitutions or variations without departing from the scope of protection of the appended claims of the present disclosure, and all of the substitutions or variations fall into the scope of protection of the present disclosure. The claimed scope of the present disclosure shall be defined by the appended claims.

The invention claimed is:

1. A vertical-bar connection assembly for a collapsible wagon, the vertical-bar connection assembly having an extended state and a folded state and being adapted to be hinged between adjacent vertical bars of the collapsible wagon, wherein the vertical-bar connection assembly comprises at least one vertical-bar connection member comprising a first connecting bar and a second connecting bar, wherein each of the first connecting bar and the second connecting bar has a proximal end and a distal end, wherein the proximal ends of the first connecting bar and the second connecting bar are hinged with each other, and wherein the distal ends of the first connecting bar and the second connecting bar are respectively adapted to be hinged with the adjacent vertical bars of the collapsible wagon, and are rotatable about their respective proximal ends to move away from or close to each other, so as to allow the vertical-bar connection assembly to be in the extended state or in the folded state, wherein the vertical-bar connection assembly comprises at least two vertical-bar connection members spaced apart, wherein during the extension and folding of the at least two vertical-bar connection members, the first connecting bars are always parallel to each other, and the second connecting bars are always parallel to each other.

2. The vertical-bar connection assembly according to claim 1, wherein the first connecting bar and the second connecting bar have equal lengths.

3. The vertical-bar connection assembly according to claim 2, wherein in the at least two vertical-bar connection members, the first connecting bars parallel to each other have same or different lengths, and the second connecting bars parallel to each other have same or different lengths.

4. The vertical-bar connection assembly according to claim 1, wherein in the extended state, the first connecting bar and the second connecting bar of the vertical-bar connection member are in a same straight line.

5. The vertical-bar connection assembly according to claim 1, wherein the vertical-bar connection assembly has a first stop portion adapted to unidirectionally restrain rotation of the first connecting bar and the second connecting bar when the vertical-bar connection assembly is in the extended state.

6. The vertical-bar connection assembly according to claim 5, wherein the vertical-bar connection assembly further comprises a groove-shaped housing connector having a groove opening forming a groove bottom wall and groove side walls, wherein the groove bottom wall serves as the first stop portion, and wherein the proximal ends of the first connecting bar and the second connecting bar are inserted into the groove-shaped housing connector respectively from the groove opening and are hinged with the groove side walls.

7. A collapsible wagon, comprising a wagon frame, wherein the wagon frame has an expanded state and a collapsed state, and comprises:

- a plurality of vertical bars arranged along a circumferential direction of the wagon frame; and
- one or more connection assemblies hinged between the adjacent vertical bars and adapted to be extended or folded to allow the wagon frame to be in the expanded state or in the collapsed state;
- wherein at least one of the connection assemblies is configured as the vertical-bar connection assembly for the collapsible wagon according to claim 1.

8. The collapsible wagon according to claim 7, wherein the wagon frame comprises a plurality of connection assemblies, wherein at least one of the plurality of connection assemblies is configured as a secondary connection assembly comprising at least two secondary connection members intersectionally arranged, wherein each of the secondary connection members comprises a third connecting bar and a fourth connecting bar hinged with each other, and wherein the third connecting bar and the fourth connecting bar are respectively hinged with the adjacent vertical bars.

9. The collapsible wagon according to claim 8, wherein in the secondary connection assembly, the intersectionally arranged secondary connection members have an intersection point and are hinged at the intersection point.

10. The collapsible wagon according to claim 7, wherein the wagon frame further comprises a chassis hinged between the plurality of vertical bars and defines a chassis plane in the expanded state.

11. The collapsible wagon according to claim 10, wherein (i) in the expanded state and in the vertical-bar connection assembly, the first connecting bar and the second connecting bar of the vertical-bar connection member are in a same straight line and are both in the chassis plane; (ii) the vertical-bar connection assembly comprises at least two vertical-bar connection members spaced apart up and down; (iii) in the expanded state the first connecting bar and the second connecting bar of the uppermost vertical-bar connection member of the vertical-bar connection assembly are in a same straight line and are both in the chassis plane; or (iv) any combination of (i)-(iii).

12. The collapsible wagon according to claim 10, wherein the chassis comprises a plurality of bottom support bars, wherein each of the bottom support bars has a convergence end and a divergence end, wherein the convergence ends of the bottom support bars are hinged with each other, and wherein the divergence ends of the bottom support bars are respectively hinged with the plurality of vertical bars and are adapted to rotate about their respective convergence ends to move away from or close to each other.

13. The collapsible wagon according to claim 12, wherein the bottom support bars have equal lengths.

14. The collapsible wagon according to claim 12, wherein the chassis has a second stop portion adapted to unidirectionally restrain rotation of the bottom support bars and to allow the plurality of bottom support bars to collectively define the chassis plane when the wagon frame is in the expanded state.

15. The collapsible wagon according to claim 14, wherein the chassis further comprises a hinge seat having a plurality of hinge grooves, each of which forms a hinge-groove bottom wall and hinge-groove side walls, wherein the hinge-groove bottom wall serves as the second stop portion, and wherein the convergence ends of the plurality of bottom support bars are respectively inserted into the plurality of hinge grooves and are hinged with the hinge-groove side walls.

16. The collapsible wagon according to claim 7, wherein the wagon frame further comprises a handle assembly comprising a handle seat and a handle bar mounted on the handle seat.

17. The collapsible wagon according to claim 16, wherein the wagon frame further comprises a handle steering assembly comprising a handle steering bar, one end of which is hinged with a vertical bar, and the other end of which is hinged with the handle seat.

18. The collapsible wagon according to claim 17, wherein the handle steering bar is hinged with the vertical bar via a hinge block.

19. The collapsible wagon according to claim 16, wherein the handle bar is configured as a telescopic bar and comprises:

- a lower tube body fixedly mounted on the handle seat, wherein an upper locking hole and a lower locking hole axially spaced apart are provided on a side wall of the lower tube body; and
- an upper tube body inserted in the lower tube body, wherein the upper tube body is provided with an elastic member and is connected to a movable button by means of the elastic member, and wherein the elastic member is adapted to bias the movable button towards the side wall of the lower tube body such that the movable button partially extends out of the upper locking hole or the lower locking hole.

20. The collapsible wagon according to claim 19, wherein the upper tube body is fixedly provided with a connecting block adapted to be placed in the lower tube body, wherein the connecting block is provided with a blind hole, and wherein the elastic member and the movable button are provided in the blind hole.

* * * * *